United States Patent
Itagi

(10) Patent No.: US 8,953,918 B2
(45) Date of Patent: Feb. 10, 2015

(54) NEAR FIELD TRANSDUCER FOR FOCUSED OPTICAL POWER DELIVERY

(75) Inventor: Amit Vasant Itagi, Eden Prairie, MN (US)

(73) Assignee: Seagate Technology LLC, Cupertino, CA (US)

(*) Notice: Subject to any disclaimer, the term of this patent is extended or adjusted under 35 U.S.C. 154(b) by 370 days.

(21) Appl. No.: 13/402,937

(22) Filed: Feb. 23, 2012

(65) Prior Publication Data

US 2013/0223806 A1  Aug. 29, 2013

(51) Int. Cl.
*G02B 6/10* (2006.01)

(52) U.S. Cl.
USPC .................. 385/132; 385/14; 385/37

(58) Field of Classification Search
CPC .............. G02B 6/12004; G02B 6/12097
USPC ............................ 385/8, 14, 37, 132
See application file for complete search history.

(56) References Cited

U.S. PATENT DOCUMENTS

| 3,830,555 | A | 8/1974 | Warner |
| 4,898,441 | A | 2/1990 | Shimizu |
| 5,222,162 | A * | 6/1993 | Yap et al. ........... 385/14 |
| 6,870,987 | B2 | 3/2005 | Lee |
| 7,773,330 | B2 | 8/2010 | Itagi et al. |
| 2004/0156590 | A1* | 8/2004 | Gunn et al. ........ 385/37 |
| 2007/0104407 | A1* | 5/2007 | Mitomi et al. ...... 385/8 |
| 2009/0245728 | A1 | 10/2009 | Cherchi et al. |

* cited by examiner

*Primary Examiner* — Mark Robinson
*Assistant Examiner* — Mary El Shammaa
(74) *Attorney, Agent, or Firm* — Hollingsworth Davis, LLC

(57) ABSTRACT

An apparatus includes a channel waveguide, a ridge waveguide including a ridge and having a bottom surface, a coupler between the channel waveguide and the ridge waveguide, the coupler including an opening configured to transmit light from the channel waveguide to the ridge waveguide, wherein the opening has a first segment having a first width and a second segment having a second width different from the first width, and a protrusion extending from the ridge beyond the plane of the bottom surface.

20 Claims, 5 Drawing Sheets

NEAR FIELD TRANSDUCER FOR FOCUSED OPTICAL POWER DELIVERY

BACKGROUND

Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. Heat assisted magnetic recording allows for the use of small grain media, which is desirable for recording at increased areal densities, with a larger magnetic anisotropy at room temperature to assure sufficient thermal stability. By heating the medium, the material's magnetic crystalline anisotropy energy density or the coercivity is reduced such that the magnetic write field is sufficient to write to the medium. Once the medium cools to ambient temperature, the medium has a sufficiently high value of coercivity to assure thermal stability of the recorded information. Heat assisted magnetic recording is also referred to a thermally assisted magnetic recording.

In heat assisted magnetic recording, confined optical energy may be delivered to a metallic data storage medium efficiently. Near field transducers (NFT's) are used for this purpose. Based on the dominant polarization of the light in the coupling region, the near field transducers can be broadly classified as longitudinal (i.e., polarization normal to the medium) or transverse type (i.e., polarization transverse to the medium). Longitudinal NFT's show promise in terms of efficiently scaling down the area of the confined region. Typically, to excite such longitudinal NFT's, an optical condenser is used to produce a longitudinal polarization of the optical energy in the focal region.

One light delivery system uses a channel waveguide. However, the dominant electric field component in typical channel waveguide modes is transverse to the direction of propagation. These modes are incompatible with longitudinal NFT's.

SUMMARY

In a first aspect, the disclosure provides an apparatus including a channel waveguide, a ridge waveguide including a ridge and having a bottom surface, a coupler between the channel waveguide and the ridge waveguide, the coupler including an opening configured to transmit light from the channel waveguide to the ridge waveguide, wherein the opening has a first segment having a first width and a second segment having a second width different from the first width, and a protrusion extending from the ridge beyond the plane of the bottom surface.

These and other features and advantages which characterize the various embodiments of the present disclosure can be understood in view of the following detailed description and the accompanying drawings.

DETAILED DESCRIPTION OF THE INVENTION

In various aspects, the disclosure encompasses transducers that are used to produce a small spot of optical energy. Such transducers can be used in recording heads for use in magnetic and/or optical data storage devices.

Figure 1:
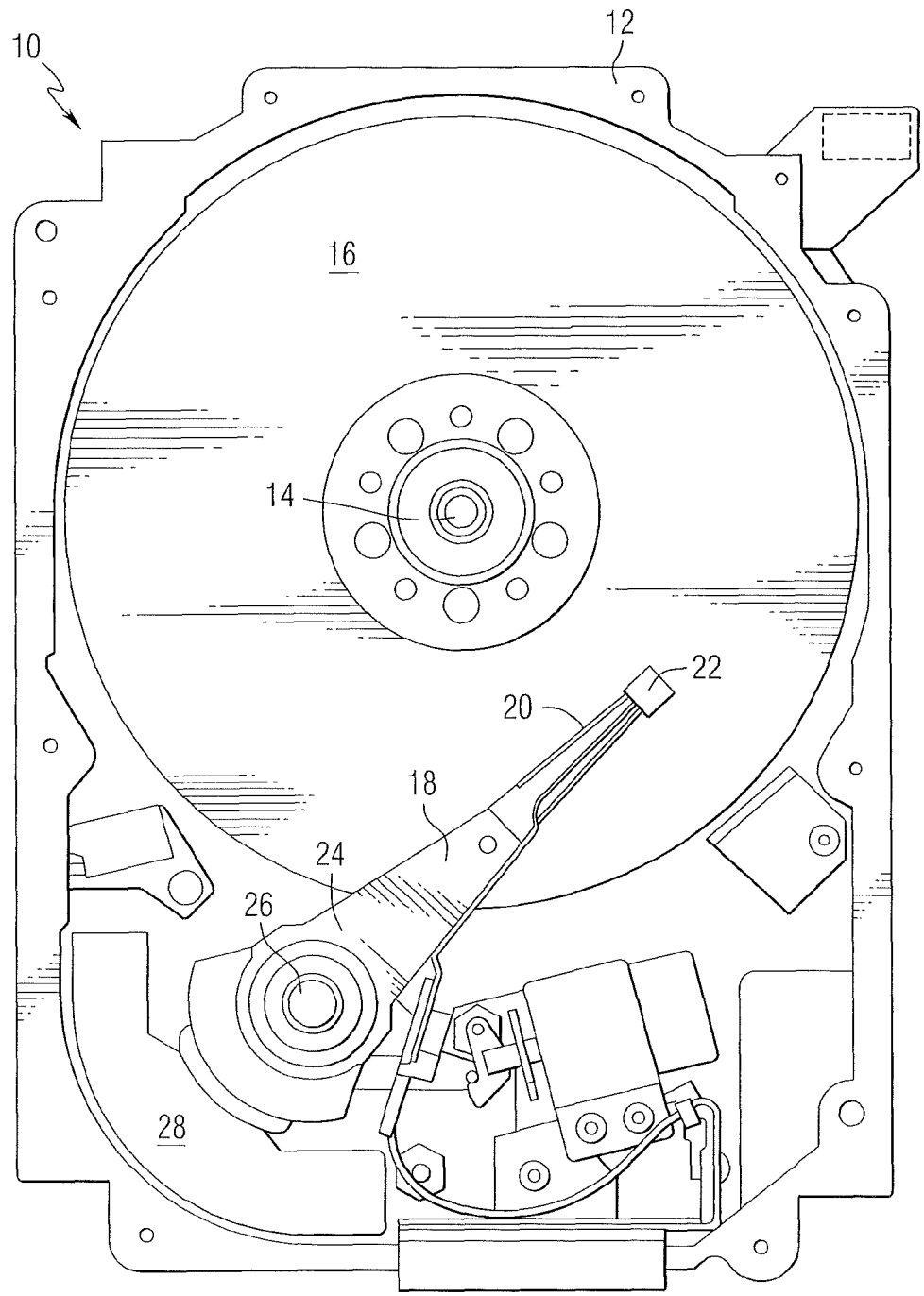
FIG. 1 is a pictorial representation of a data storage device in the form of a disc drive that can include a transducer in accordance with an aspect of this disclosure.

FIG. 1 is a pictorial representation of a disc drive 10 that can utilize transducer assemblies constructed in accordance with this disclosure. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well known in the art.

While FIG. 1 shows a disc drive, the disclosure can be applied to other storage devices that include a transducer for concentrating electromagnetic radiation to a small spot. Other such storage devices can include, for example, probe type data storage devices. In addition, the transducers of this disclosure can be used in other applications that can benefit from the concentration of electromagnetic radiation into a small spot. Such other applications include nanomanufacturing, and biomedical optical sensing.

In one aspect, this disclosure provides an apparatus for generating a confined optical spot, at a point on or adjacent to a recording medium, from a laser beam with high efficiency. One known way to generate a confined longitudinal electric field is to use the lightning rod effect. In this aspect, the disclosure provides an apparatus for exciting surface plasmon modes in a lightning rod structure.

Figure 2:
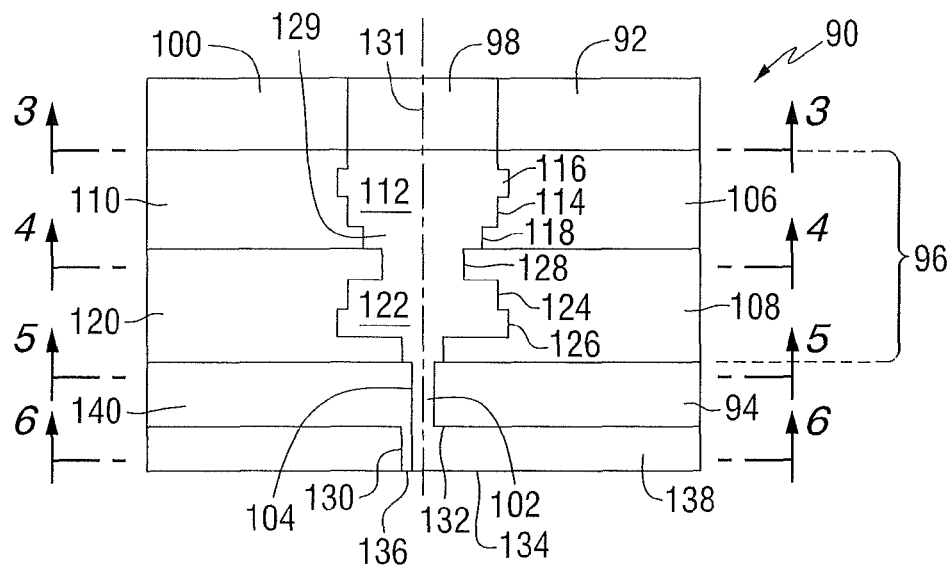
FIG. 2 is a cross-sectional view of an apparatus in accordance with an aspect of the disclosure.
Figure 3:
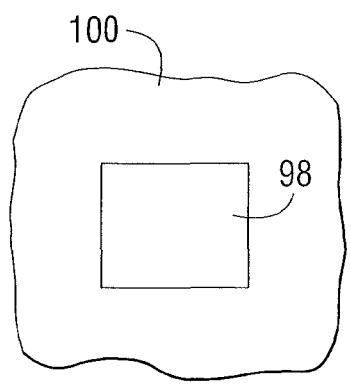
FIG. 3 is a cross-sectional view of the apparatus of FIG. 2 taken along lines 3-3.
Figure 4:
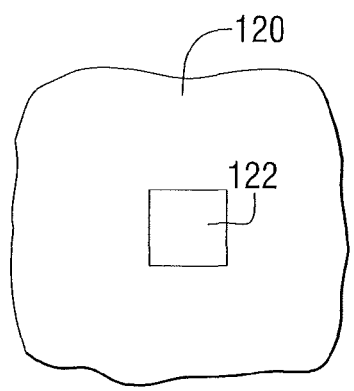
FIG. 4 is a cross-sectional view of the apparatus of FIG. 2 taken along lines 4-4.
Figure 5:
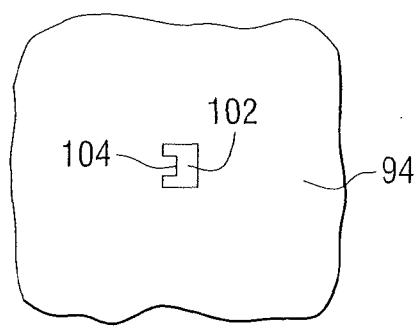
FIG. 5 is a cross-sectional view of the apparatus of FIG. 2 taken along lines 5-5.
Figure 6:
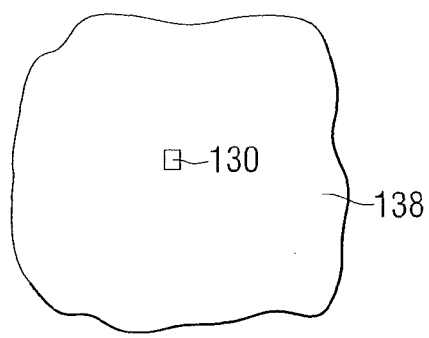
FIG. 6 is a cross-sectional view of the apparatus of FIG. 2 taken along lines 6-6.

FIG. 2 is a schematic representation of an apparatus 90 for producing a small spot of optical energy in accordance with another embodiment of the disclosure. FIG. 3 is a cross-sectional view of the apparatus of FIG. 2 taken along lines 3-3. FIG. 4 is a cross-sectional view of the apparatus of FIG. 2 taken along lines 4-4. FIG. 5 is a cross-sectional view of the apparatus of FIG. 2 taken along lines 5-5. FIG. 6 is a cross-sectional view of the apparatus of FIG. 3 taken along lines 6-6.

The apparatus of FIG. 2 may be used in a recording head of a data storage device to produce a small spot of optical energy on a recording medium. FIG. 2 shows an optical transducer 90 that includes a channel waveguide 92, a ridge waveguide 94 and a coupler 96 between the channel waveguide and the ridge waveguide. The channel waveguide includes a core layer 98, surrounded by a cladding layer 100. The core layer 98 can have a rectangular cross-sectional shape in a plane perpendicular to the plane of the drawing. The ridge waveguide includes an opening 102 with a ridge 104 extending along a side of the opening. The coupler 96 includes a dielectric section 106 and a metallic section 108. The dielectric section includes a dielectric material 110 surrounding an opening 112. The wall 114 of the opening 112 includes a recess 116 and a protrusion 118. The metallic section 108 includes a metallic material 120 surrounding an opening 122. The wall 124 of the opening 122 includes a recess 126 and a protrusion 128. Openings 112 and 122 together form a central opening 129 between the channel waveguide and the ridge waveguide. The central opening is configured to transmit light from the channel waveguide to the ridge waveguide. In this example, the central opening is symmetrical with respect to a central axis 131.

The central opening in this example has a plurality of segments each having a rectangular cross-sectional shape (in planes perpendicular to the plane of the drawing) wherein the segments have different widths and different cross-sectional areas. The segments are portions of the opening defined by walls in planes substantially parallel to the central axis 131. Edges of the protrusions and bottoms of the recesses form portions of the walls of the opening. In the example of FIG. 2, the portion of the opening surrounded by the metallic material 120 has four segments and the portion of the opening surrounded by the dielectric material 110 has four segments. The width of at least one of the segments differs from the width of the core of the channel waveguide.

An elongated structure in the form of a lightning rod 130 (also called a protrusion) extends from an end of the ridge adjacent to a bottom surface 132 of the ridge waveguide toward an air bearing surface 134. An end 136 of the lightning rod is positioned adjacent to the air bearing surface. The lightning rod is surrounded by a dielectric material 138, which can be air. In one example, the lightning rod has a square cross-sectional shape with a width of about 20 nm to about 50 nm. More generally, the lightning rod can be a sharp pin.

The material 140 of the ridge waveguide can be, for example gold, copper, silver, aluminum and their alloys. The material 138 in the region surrounding the lightning rod can be, for example, air, alumina, silica, etc. The lightning rod can be a plasmonic material such as gold. The material that fills the central opening can be for example, tantala, silicon nitride, titania, etc. The dielectric material 110 can be, for example, alumina, silica, etc. The metallic material 120 can be, for example, gold, copper, silver, aluminum and their alloys. When used in a recording head, the elongated structure may extend toward or beyond an air bearing surface of a recording head.

For any waveguide (e.g., a dielectric channel waveguide or a metallic waveguide), if the cross-sectional extent of the mode is a few factors smaller than the wavelength of light in the core, the mode cannot have the transverse field component much stronger than the longitudinal field component. In other words, such a mode will display a strong longitudinal field.

One such metallic waveguide is the ridge waveguide. For a ridge waveguide, if the dimensions are chosen properly, a strong longitudinal field can be obtained near the ridge. By attaching a lightning rod to the ridge, the lightning rod effect can be obtained. While the coupler in FIG. 2 includes both a dielectric section and a metallic section, the coupler could be constructed with only the metallic section.

The ridge waveguide mode needs to be efficiently excited from the dielectric channel waveguide mode. The coupler of FIG. 2 performs mode (or impedance) matching between the channel waveguide and the ridge waveguide. Matching between the channel waveguide and the ridge waveguide is achieved by the coupler. As shown in FIG. 2, the coupler can be implemented as a cascade of multiple rectangular waveguide regions or segments that maximize the coupling of the two modes through the phenomenon of interference.

The cross-sectional width of the central opening in the coupler changes as a result of recesses and/or protrusions in the walls of the coupler. The width and the length determine the impedance of the coupler segment. In addition, the steps between the segments give rise to parasitic impedances. The effect of putting these impedances together in a network gives rise to the mode matching. The widths and the lengths of the segments can be optimized using numerical codes. In one example, the length of each segment is between about 50 and about 400 nm. The width of the segments can also be between about 50 and about 400 nm.

Similarly, the ridge mode needs to excite the lightning rod mode efficiently. Ridge to lightning rod matching can be obtained by terminating a denser ridge waveguide core material at the end of the ridge waveguide and surrounding the lightning rod in an appropriate rarer dielectric material 138. A denser dielectric material has a higher refractive index than a rarer dielectric material. Typically, if the core of the ridge waveguide and the medium surrounding the rod is the same, the mode index of the fundamental lightning rod mode will be much larger than the mode index of the fundamental ridge waveguide mode. Thus, it would be desirable to use a material having a lower the dielectric constant around the rod.

Figure 7:
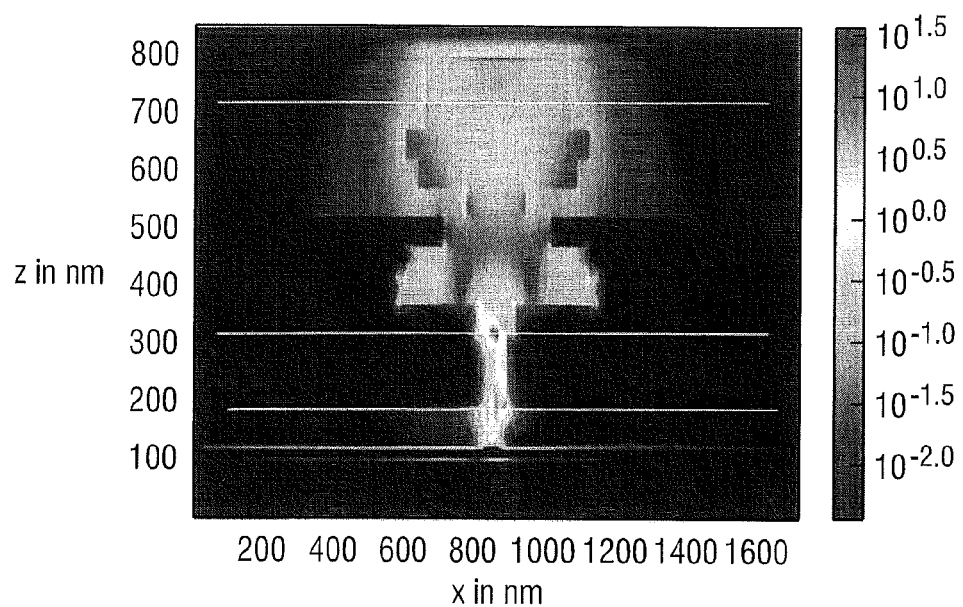
FIG. 7 is a modeled thermal profile of the apparatus of FIG. 3.
Figure 8:
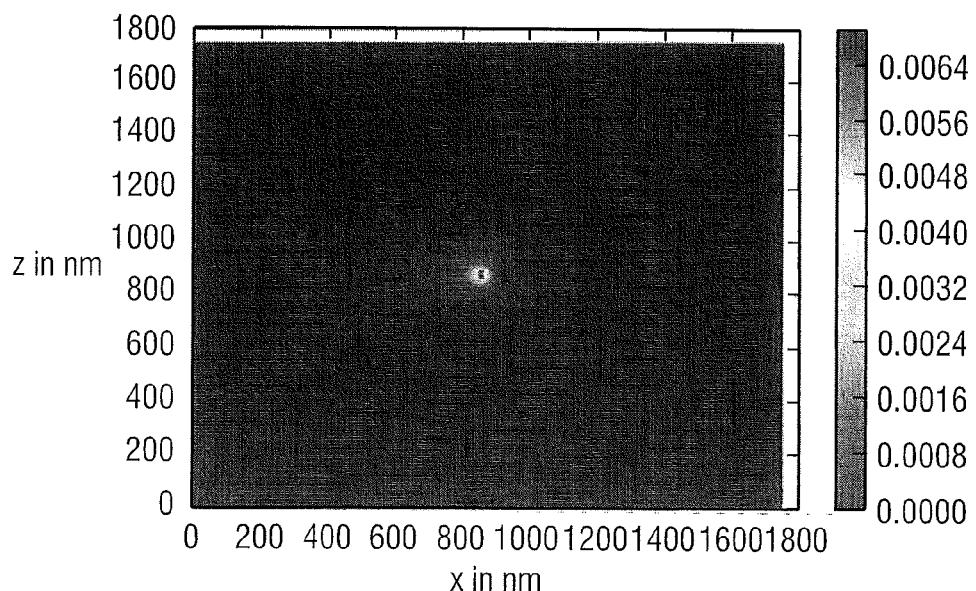
FIG. 8 is a modeled thermal profile of a portion of a recording medium.

FIG. 7 is a modeled thermal profile of the apparatus of FIG. 2. FIG. 8 is a modeled thermal profile of a portion of a recording medium heated using the apparatus of FIG. 2.

Figure 9:
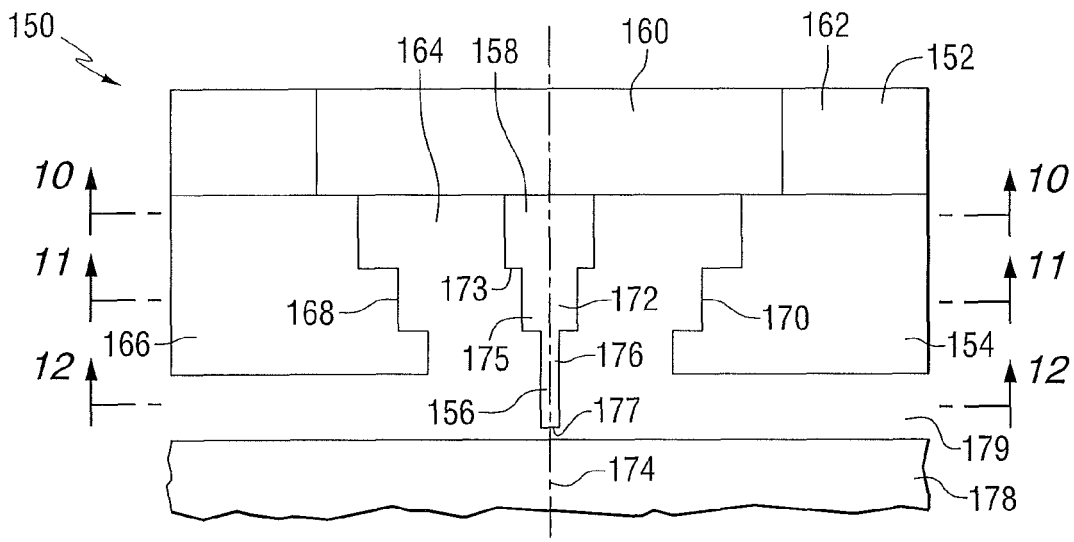
FIG. 9 is a cross-sectional view of an apparatus in accordance with another aspect of the disclosure.

FIG. 9 is a cross-sectional view of an apparatus 150 in accordance with another aspect of the disclosure. The apparatus of FIG. 9 includes a channel waveguide 152, a ridge waveguide 154 and a lightning rod 156 extending from the ridge 158 in the ridge waveguide. The channel waveguide includes a core layer 160, surrounded by a cladding layer 162. The core layer 160 has a rectangular cross-sectional shape in a plane perpendicular to the plane of the drawing. The ridge waveguide includes an opening 164 with a ridge 158 extending along a portion of a side of the opening.

The opening 164 of the ridge waveguide is surrounded by a dielectric material 166 that defines walls 168 and 170. The walls have a stepped profile such that the opening 164 is larger adjacent to the channel waveguide and has a reduced cross-sectional area as the distance from the channel waveguide increases. A protrusion (or lightning rod) 172 extends from an end 173 of the ridge and is spaced from the wall of the ridge waveguide opening. The lightning rod is positioned along a central axis 174, includes two sections 175 and 176 of different widths, and has an end 177 that may be positioned adjacent to an air bearing surface of a recording head. A recording medium 178 is shown under the lightning rod. The opening 164 is shown to include multiple segments having different widths as defined by the opening sidewalls. The ridge is connected to a sidewall of the top segment.

In one example, section 176 of the lightning rod has a square cross-sectional shape in a plane perpendicular to the plane of the drawing, with a width of about 20 nm to about 50 nm. More generally, the lightning rod can be a sharp pin. The lightning rod 156 is surrounded by a dielectric material 179. The cladding material for the ridge waveguide can be, for example, silicon nitride. The material surrounding the lightning rod can be the same material as the cladding material of the ridge waveguide. The lightning rod can be a plasmonic material such as gold. When used in a recording head, the lightning rod may extend toward or beyond an air bearing surface of a recording head.

Figure 10:
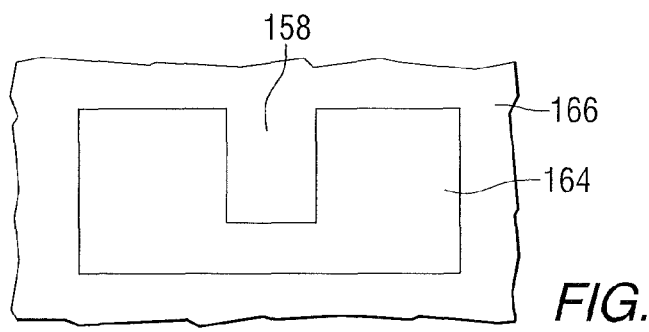
FIG. 10 is a cross-sectional view of the apparatus of FIG. 9 taken along lines 10-10.
Figure 11:
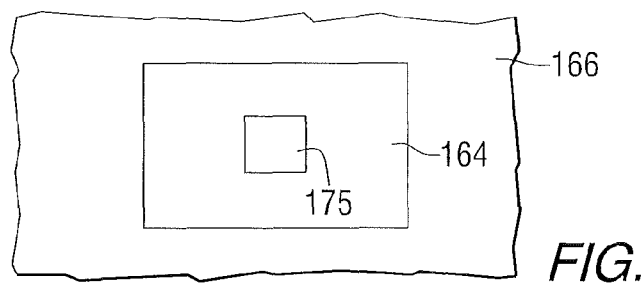
FIG. 11 is a cross-sectional view of the apparatus of FIG. 9 taken along lines 11-11.
Figure 12:
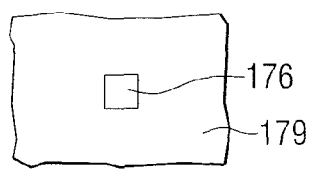
FIG. 12 is a cross-sectional view of the apparatus of FIG. 9 taken along lines 12-12.

FIG. 10 is a cross-sectional view of the apparatus of FIG. 9 taken along lines 10-10. FIG. 11 is a cross-sectional view of the apparatus of FIG. 9 taken along lines 11-11. FIG. 12 is a cross-sectional view of the apparatus of FIG. 9 taken along lines 12-12.

As the cross-sectional area of the ridge waveguide is reduced gradually with the steps in the walls of the opening, the mode wavelength and decay length decrease. This increases the ratio of the longitudinal electric field to the transverse electric field in the mode. The longitudinal electric field is used to excite the lightning rod mode.

Figure 13:
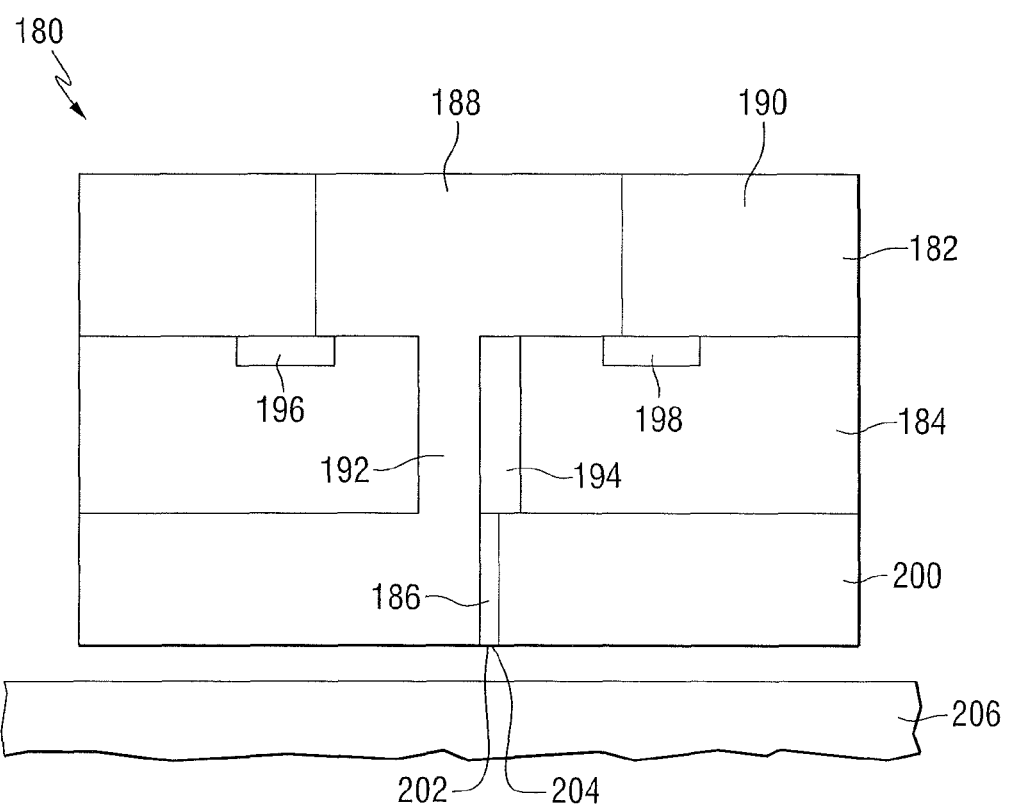
FIG. 13 is a cross-sectional view of an optical transducer in accordance with another aspect of the disclosure.

FIG. 13 is a schematic representation of another apparatus 180 for producing a small spot of optical energy in accordance with another aspect of the disclosure. The apparatus includes a channel waveguide 182, a ridge waveguide 184 and a lightning rod 186 extending from the ridge of the ridge waveguide. The channel waveguide includes a core layer 188, surrounded by a cladding layer 190. The core layer 188 has a rectangular cross-sectional shape in a plane perpendicular to the plane of the drawing. The ridge waveguide includes an opening 192 with a ridge 194 extending along a side of the opening. Indents 196 and 198 are provided in a surface of the ridge waveguide adjacent to an interface between the channel waveguide and the ridge waveguide. In the example of FIG. 13, the indents have a rectangular cross-sectional shape.

In one example, the lightning rod has a square cross-sectional shape in a plane perpendicular to the plane of the drawing, with a width of about 20 nm to about 50 nm. More generally, the lightning rod can be a sharp pin. The lightning rod 186 is surrounded by a dielectric material 200. The cladding material for the ridge waveguide can be, for example, silicon nitride. The material surrounding the lightning rod can be the same material as the cladding of the ridge waveguide. The lightning rod can be a plasmonic material such as gold. When used in a recording head, an end 202 of the lightning rod may be positioned adjacent to an air bearing surface 204 of a recording head. A recording medium 206 is shown under the lightning rod. The indents can be filled with dielectric materials, for example, alumina, silica, tantala, silicon nitride, titania, etc.

In the various embodiments described above, optical energy from an optical energy source such as a laser may be coupled to the channel waveguide using known coupling techniques. Optical energy propagates through the channel waveguide, which may be formed, for example, by a thin film structure. The thin films may include a guiding layer of $SiN_x$ sandwiched between $SiO_2$ sidewall cladding layers. The incident optical energy may comprise multiple energy modes including transverse electric (TE) and transverse magnetic (TM) modes. However, the channel waveguide allows a single mode of the optical energy to propagate through the channel waveguide, effectively cutting-off propagation of higher order modes. After propagating through the channel waveguide, the optical energy is coupled to a second waveguide, which can be a ridge waveguide.

To increase the dimensions of the various elements of the apparatus, and thus reduce the sensitivity to fabrication variations, a wavelength of 1550 nm can be chosen for the optical energy. Based on a limited optimization, in one example, the power coupled into the medium is estimated to be between about 1% and about 5% of the power incident in the channel waveguide mode. Extensive optimization of the dimensions could enhance the coupling efficiency. The spot size is similar to the cross-sectional width of the lightning rod (e.g., about 20 to about 50 nm). While a wavelength of 1550 nm was used for the above example, the concept can be applied to shorter wavelengths. However, the overall dimensions of the transducer would be expected to shrink. Moreover, a linear scaling of the channel waveguide dimensions is not possible, since core materials with a refractive index as large as Si are lossy at shorter wavelengths.

In one embodiment, the disclosure provides an apparatus including a channel waveguide, a ridge waveguide positioned adjacent to the channel waveguide, the ridge waveguide including an opening that as a decreasing cross-sectional area as distance from the channel waveguide increases, a ridge extending from a side of the opening, and a protrusion connected to the ridge and extending beyond a plane of a bottom surface of the ridge waveguide. The opening can include a first segment having a first width and a second segment having a second width, the second width being smaller than the first width. The ridge can be positioned in the first segment. The protrusion can be positioned along a central axis of the opening. The protrusion can include sections of different widths. The protrusion can have a rectangular cross-sectional shape and a width in a range from about 10 nm to about 50 nm.

In another embodiment, the disclosure provides an apparatus including a channel waveguide, a ridge waveguide positioned adjacent to the channel waveguide, the ridge waveguide having a ridge in an opening and having to a bottom surface, a plurality of indents in a surface of the ridge waveguide adjacent to the channel waveguide, and a protrusion extending from the ridge beyond the plane of the bottom surface. The indents can have a rectangular cross-sectional shape. The indents can be filled with a dielectric material. The apparatus can further include a first dielectric material in the ridge waveguide and a second dielectric material surrounding the protrusion, wherein the second dielectric material has a lower refractive index than the first dielectric material. The protrusion can have a rectangular cross-sectional shape and a width in a range from about 10 nm to about 50 nm.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:
1. An apparatus, comprising:
a channel waveguide extending along a central axis;
a ridge waveguide extending along the central axis toward an air bearing surface, the ridge waveguide including an opening and a ridge extending within and along a side of the opening;

a coupler between the channel waveguide and the ridge waveguide, the coupler including an opening configured to transmit light from the channel waveguide to the ridge waveguide, wherein the opening has a first segment having a first width and a second segment having a second width different from the first width; and a protrusion extending beyond the ridge towards the air bearing surface.

2. The apparatus of claim 1, wherein the coupler comprises:
a metallic layer surrounding a first portion of the opening that is proximate the ridge waveguide; and
a dielectric layer surrounding a second portion of the opening that is proximate the channel waveguide.

3. The apparatus of claim 1, wherein the opening has a rectangular cross-sectional shape and each of the segments has width in a range from about 50 to about 400 nm and a length in a range of from about 50 to about 400 nm.

4. The apparatus of claim 1, wherein the protrusion generates a confined longitudinal electric field that excites surface plasmons at the protrusion.

5. The apparatus of claim 1, wherein the opening includes additional segments, each having a rectangular cross-sectional shape wherein the first segment, second segment, and additional segments comprise a smaller-width segment surrounded by larger-width segments.

6. The apparatus of claim 1, wherein the channel waveguide includes a core having a rectangular cross-sectional shape and a dielectric material adjacent to the core, wherein at least one of the segments has a width less than the width of the core.

7. The apparatus of claim 1, further comprising:
a first dielectric material in the ridge waveguide and a second dielectric material surrounding the protrusion, wherein the second dielectric material has a lower refractive index than the first dielectric material.

8. The apparatus of claim 1, wherein the protrusion comprises a plasmonic material.

9. The apparatus of claim 1, wherein the coupler performs mode or impedance matching between the channel waveguide and the ridge waveguide.

10. An apparatus, comprising:
a channel waveguide extending along a central axis;
a ridge waveguide positioned adjacent to the channel waveguide, the ridge waveguide including an opening extending along the central axis that has a decreasing cross-sectional area as distance from the channel waveguide increases;
a ridge extending along the central axis and into a side of the opening; and
a protrusion coupled with the ridge and extending beyond a plane of a bottom surface of the ridge waveguide.

11. The apparatus of claim 10, wherein the opening includes a first segment having a first width and a second segment having a second width, the second width being smaller than the first width.

12. The apparatus of claim 11, wherein the ridge is positioned in the first segment.

13. The apparatus of claim 10, wherein the protrusion is positioned along a central axis of the opening.

14. The apparatus of claim 10, wherein the protrusion has sections of different width.

15. The apparatus of claim 10, wherein the protrusion generates a confined longitudinal electric field that excites surface plasmons at the protrusion.

16. An apparatus, comprising:
a channel waveguide extending along a central axis;
a ridge waveguide positioned adjacent to the channel waveguide, the ridge waveguide extending along the central axis toward an air bearing surface, the ridge waveguide having a ridge in an opening;
a plurality of indents in a surface of the ridge waveguide and adjacent to the channel waveguide; and
a protrusion extending from the ridge towards the air bearing surface.

17. The apparatus of claim 16, wherein the indents have a rectangular cross-sectional shape.

18. The apparatus of claim 16, wherein the indents are filled with a dielectric material.

19. The apparatus of claim 16, further comprising:
a first dielectric material in the ridge waveguide and a second dielectric material surrounding the protrusion, wherein the second dielectric material has a lower refractive index than the first dielectric material.

20. The apparatus of claim 16, wherein the protrusion generates a confined longitudinal electric field that excites surface plasmons at the protrusion.

* * * * *